United States Patent [19]

Wozniak

[11] 4,136,359

[45] Jan. 23, 1979

[54] MICROCOMPUTER FOR USE WITH VIDEO DISPLAY

[75] Inventor: Stephen G. Wozniak, Cupertino, Calif.

[73] Assignee: Apple Computer, Inc., Cupertino, Calif.

[21] Appl. No.: 786,197

[22] Filed: Apr. 11, 1977

[51] Int. Cl.² .................... H04N 9/44

[52] U.S. Cl. .................... 358/17

[58] Field of Search .................... 358/17, 148, 150

[56] References Cited

U.S. PATENT DOCUMENTS 3,581,011 5/1971 Ward et al. .................... 358/17

*Primary Examiner*—Richard Murray

*Attorney, Agent, or Firm*—Blakely, Sokoloff, Taylor & Zafman

[57] ABSTRACT

A microcomputer including a video generator and timing means which provides color and high resolution graphics on a standard, raster scanned, cathode ray tube is disclosed. A horizontal synchronization counter is synchronized at an odd-submultiple of the color subcarrier reference frequency. A "delayed" count is employed in the horizontal synchronization counter to compensate for color subcarrier phase reversals between lines for the non-interlaced fields. This permits vertically aligned color graphics without substantially altering the standard horizontal synchronization frequency. Video color signals are generated directly from digital signals by employing a recirculating shift register.

8 Claims, 4 Drawing Figures

MICROCOMPUTER FOR USE WITH VIDEO DISPLAY

BACKGROUND OF THE INVENTION

1. Field of the Invention

The invention is for the generation of signals for raster scanned video displays employing digital means.

2. Prior Art

With the reduced cost of large scale integrated circuits it has become possible to provide low-cost microcomputers suitable for home use. One such use which has flourished in recent years is the application of microcomputers in conjunction with video displays for games and graphic displays. Most often an ordinary television receiver is employed as the video display means. The standard, raster scanned, cathode ray tubes employed in these receivers and like displays, present unique problems in interfacing these displays with the digital information provided by the microcomputer.

In presenting color graphics it is, of course, desirable to provide high resolution lines and to avoid "ragged" lines. In a microcomputer controlled display, typically a single frequency reference source is employed to generate the color subcarrier reference signal of 3.579545Mhz and the horizontal and vertical synchronization signals. If the frequency of the horizontal synchronization signals is to remain close to its normal frequency (i.e. 15,750hz) the horizontal synchronization means must operate at an odd-submultiple of the color subcarrier frequency. When this occurs there is a phase reversal or phase shift of the color subcarrier reference signal when compared to color control signal between each of the lines of the display. This results in ragged vertical lines unless the color signals are changed for each line. One prior art solution to this problem has been to operate the horizontal synchronization counter at an even submultiple of the color subcarrier frequency (i.e. 15,980hz). This deviation from the standard horizontal synchronization frequency typically requires manual adjustment of the receiver and for some receivers horizontal synchronization may be more difficult to maintain.

As will be described with the invented microcomputer, the horizontal counter operates close to its standard frequency (15,734hz). Through use of a timing compensation means, counting in the horizontal synchronization counter is delayed to compensate for the fact that the counter operates at an odd-submultiple frequency of a color reference signal. In this manner, phase reversal of the color reference signal is eliminated and sharp graphic displays are provided without complex programming.

In many prior art microcomputer controlled displays, color information is stored as four digital bits which are used to designate green, red, blue, and high/low intensity. The color generation means generally includes a signal generator for generating the pure color signals (CW). These pure color signals are then gated and mixed in accordance with the binary state of the four bits to provide a color signal compatible with standard television receivers. Generation of the video color signal in this manner is complex and requires a substantial amount of circuitry.

The invented microprocessor includes a recirculating shift register which circulates four bits of information. In this manner video color signals are generated directly from digital information without the cumbersome generation techniques employed in the prior art.

SUMMARY OF THE INVENTION

A microprocessor for use with a video display is described. The microprocessor includes an improved timing apparatus which provides well-defined color graphics on a standard, raster scanned, cathode ray tube. A timing reference means is employed to provide a color reference signal for the video display. A horizontal synchronization means which is synchronized to the timing reference means provides horizontal synchronization signals for the display. These signals occur at a rate which is an odd-submultiple of the color reference signal frequency. The timing apparatus includes a compensation means which is coupled to both the timing reference means and the synchronization means for periodically adjusting the horizontal synchronization signals such that these signals remain in phase relationship with the color reference signal.

The microcomputer also includes a unique color signal generation means which uses a recirculating shift register. This register receives digital signals representative of color from memory and circulates this data at a predetermined rate. In this manner a color signal suitable for use with a video display is generated from the digital signals.

DETAILED DESCRIPTION OF THE INVENTION:

A microcomputer is disclosed which is particularly suitable for controlling color graphics on a standard, raster scanned, cathode ray tube. The described microcomputer includes a video generator which generates color signals directly from digital information, and a timing means which provides well defined color graphics, particularly in the vertical direction, without complex programming.

In the following description, numerous well-known circuits are shown in block diagram form in order not to obscure the described inventive concepts in unnecessary detail. In other instances, very specific details such as frequencies, number of bits, specific codes, etc., are providing in order that these inventive concepts may be clearly understood. It will be apparent to one skilled in the art that the described inventive concepts may be employed without use of these specific details.

Figure 1:
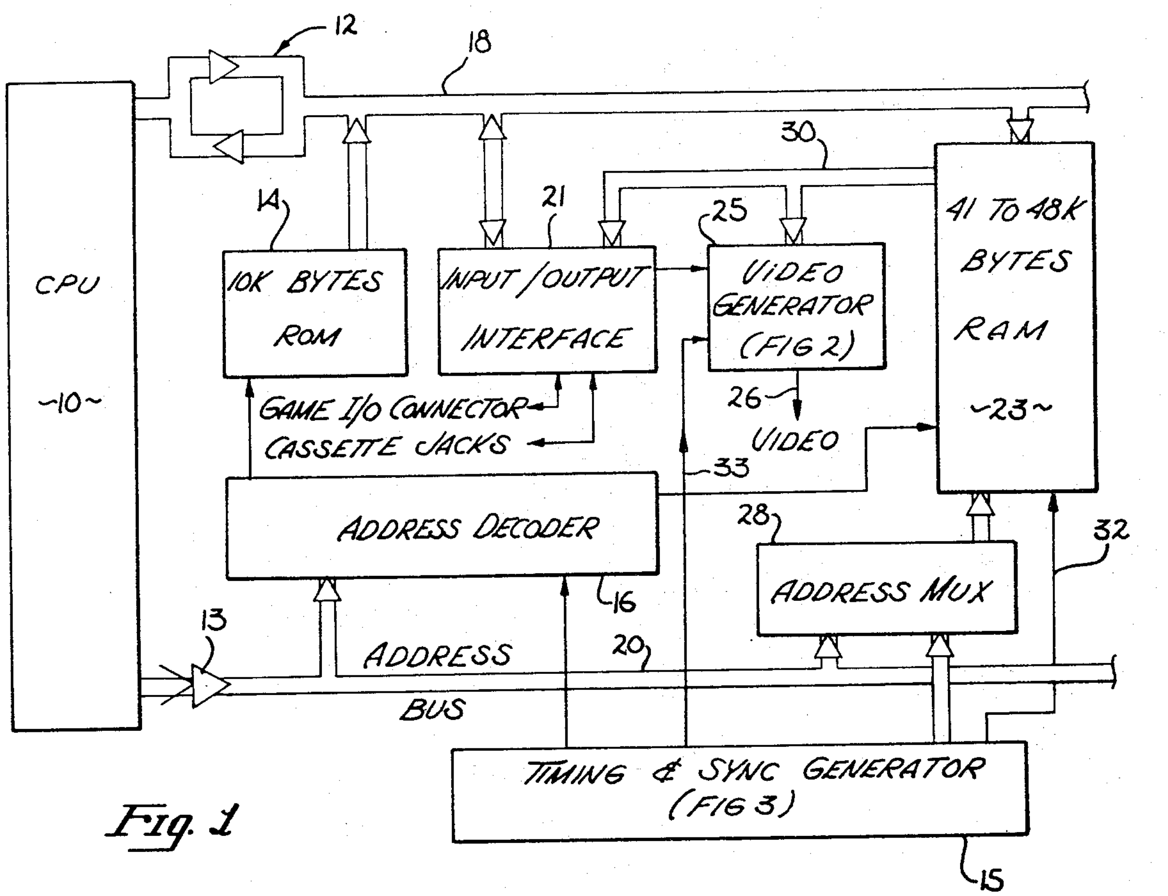
FIG. 1 is a general block diagram illustrating the invented microcomputer in its presently preferred embodiment.

Referring now to FIG. 1, the microcomputer includes a central processing unit (CPU) or microprocessor 10. While any one of a plurality of commercially available microprocessors may be employed such as the M6800 or 8080, in the presently preferred embodiment, a commercially available microprocessor, Part No. 6502, is employed. CPU 10 communicates with the data bus 18 through a bidirectional tri-state buffer 12. The CPU 10 is also coupled to the address bus 20 through a tri-state buffer 13.

The microcomputer, in its presently preferred embodiment, includes two memories. The first is a 12K (bytes) read-only memory (ROM) 14 which is coupled to the data bus 18. This ROM may be a mask programmable memory, E PROM or other read-only memory. The primary data storage for the computer comprises the random-access memory 23. In the presently preferred embodiment, this memory may contain 4K to 48K (bytes) and comprises commercially available dynamic MOS memories. The RAM 23 is coupled to the input/output interface means 21 via bus 30, the data bus 18 and the video generator 25.

The timing signals for the microcomputer are provided by the timing and synchronization generator 15. The novel portions of this generator shall be described, in detail, in conjunction with FIG. 3. This generator provides timing signals for the microcomputer, and additionally, synchronization signals for the video display. Among the signals provided by the generator 15 are 2+Mhz timing signals on lines 32 for the RAMs 23 and a 14.31818Mhz signal on line 33 for the video generator 25. The timing and synchronization generator 15 also provides timing signals for the decoder 16 and for the address multiplexer 28.

The address decoder 16 receives address signals from the address bus 20 and decodes them in a well-known manner. The address decoder 16 is coupled to the ROM 14 and to the RAM 23. Address signals are also received from the bus 20 by the address multiplexer 28 which couples these signals to the RAM 23.

The input/output interface means 22 provides ports which allows the microprocessor to be electrically coupled to a cassette jack or to a connector used for receiving game input/output signals. Known buffers and timing means may be employed for this purpose.

The video generator 25 receives signals from the input/output interface means 21 and also from the RAM 23. This generator provides an output video signal on line 26. Video generator 25 shall be described, in detail, in conjunction with FIG. 2.

In the presently preferred embodiment, the entire microcomputer of FIG. 1 is fabricated on a single printed circuit board. This board includes connectors to allow the computer to be connected to a cassette playback means, or other devices. As will be appreciated, numerous well-known interconnections, driver means and other circuits employed in the microcomputer are not shown in FIG. 1. For a detailed description of circuits and interconnections which may be employed in the microprocessor of FIG. 1, including a transparent refresh cycle for the RAMs 23, see "*A CRT Terminal Using The M6800 Family*" by Roy & Morris, *Interface Age*, Volume 2, Issue 2, January 1977.

Figure 2:
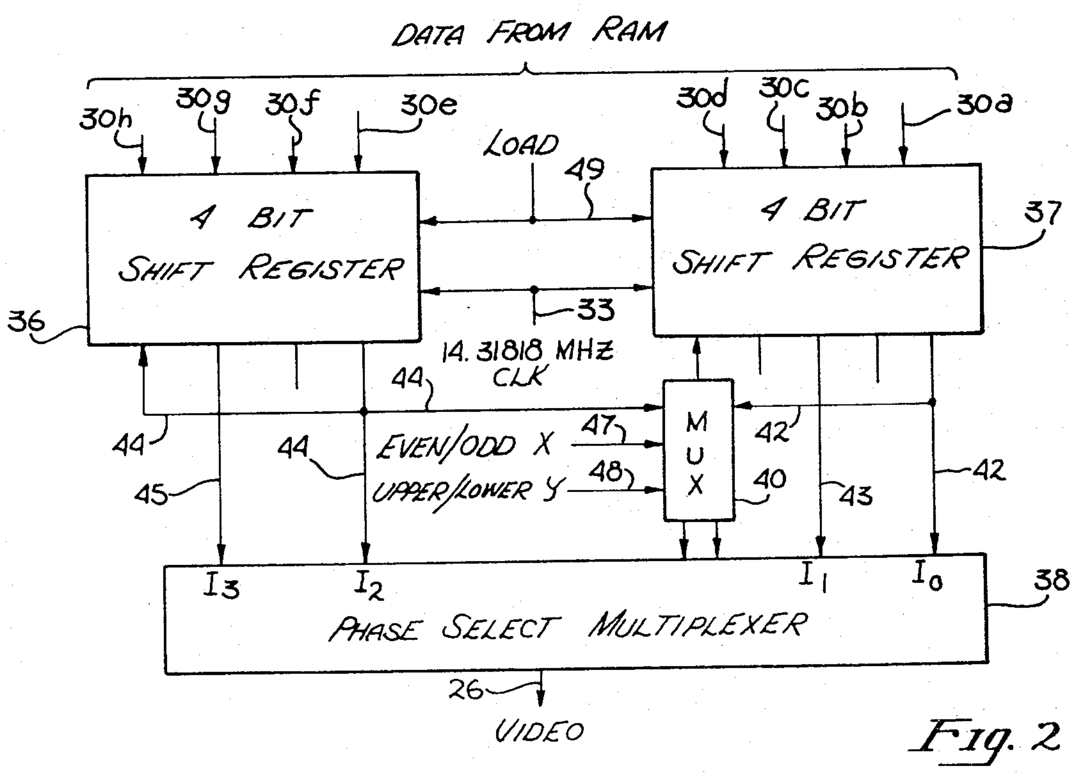
FIG. 2 is a block diagram of the video generator employed in the microcomputer of FIG. 1.
Figure 3:
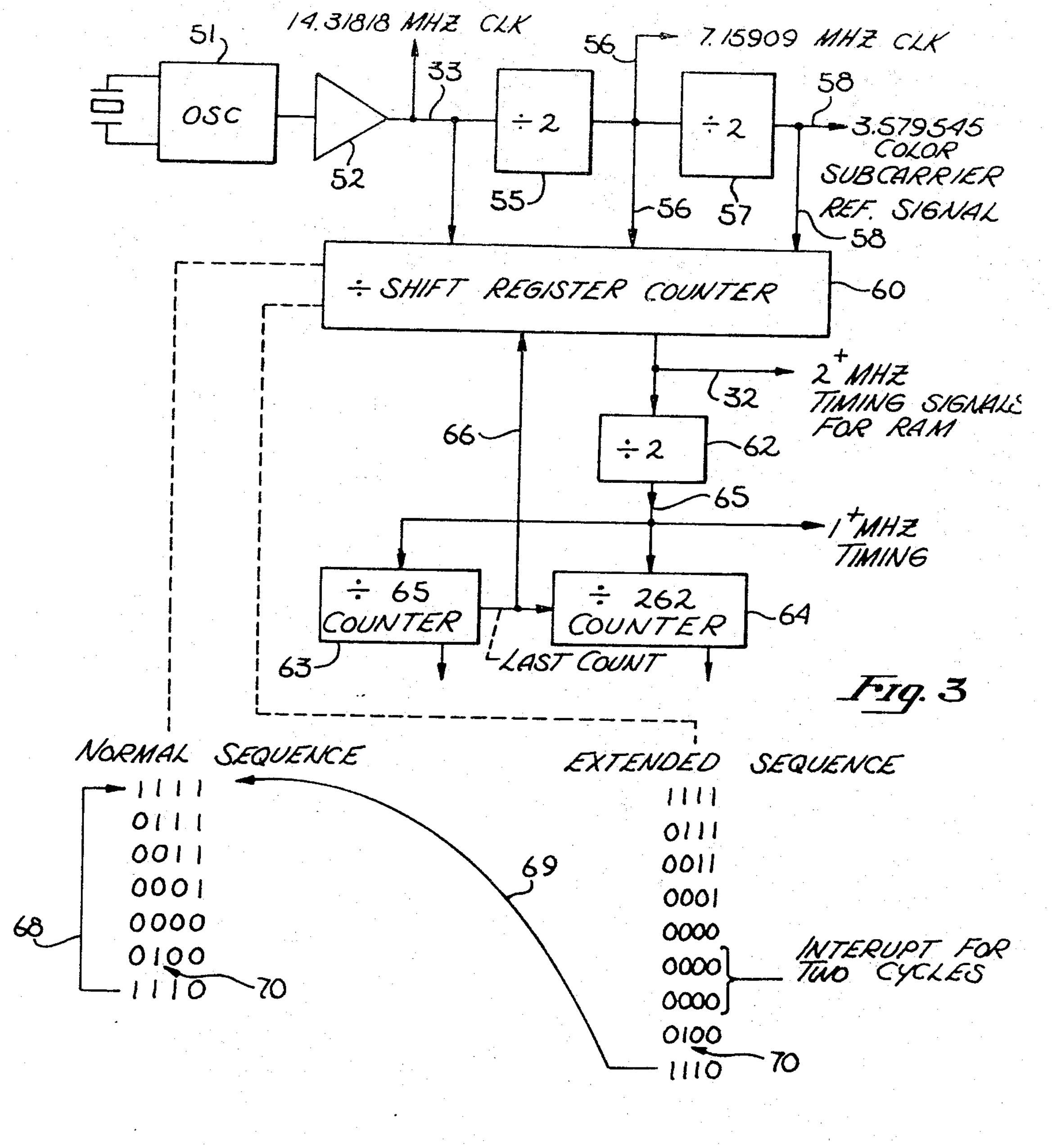
FIG. 3 is a block diagram of the timing and synchronization generator employed in the computer of FIG. 1.

Referring now to FIG. 3, the timing and synchronization generator (timing means) includes a frequency reference source, crystal oscillator 51. The output of oscillator 51 is coupled to a buffer 52 which provides a 14.31818Mhz signal on line 33 for the presently preferred embodiment. This signal is coupled to the video generator of FIG. 2 as will be described, and is also coupled to the shift register counter 60 and the divider 55. The divider 55 divides the 14.31818Mhz signal by two, thereby providing a 7.15909Mhz signal on line 56. This signal is employed by the microprocessor as a timing signal, and additionally, is employed by the shift register counter 60 as a feedback synchronization signal. The signal on line 56 is further divided by two, by divider 57, to provide the standard color subcarrier reference signal of 3.579545Mhz on line 58. The signal on line 58 is used in an ordinary manner by the video display and also is used as a feedback synchronization signal by the shift register counter 60.

The 14.3Mhz signal on line 33 is divided by seven, by the shift register counter 60 to provide a 2+Mhz signal on line 32. This signal is used by the RAMs 23 of FIG. 1. This 2+Mhz signal is further divided by divider 62 (divided by two) to provide a 1+Mhz timing signal on line 65. This 1+Mhz signal in addition to being employed elsewhere in the microprocessor is used by counters 63 and 64.

The "divide-by-65" counter 63 is used to provide the horizontal synchronization signals for the non-interlaced display. When the maximum count is reached within the counter 63, a signal is provided on line 66 to shift register 60 and also to the vertical synchronization counter 64. The counter 64 is employed to divide this signal by 262 to provide vertical synchronization signals.

In the presently preferred embodiment, the display is divided into a 65×262 array. However, 25 of the 65 horizontal character positions are employed for blanking and 70 of the 262 lines are also employed for blanking.

It is apparent from FIG. 3 that the horizontal synchronization signals from counter 63 occur at a frequency of approximately 15,734hz. This is very close to the standard horizontal synchronization rate of 15,750hz. Each count of the counter 63 includes 3½ color cycle of the color subcarrier reference frequency; moreover, the total number of color cycles per line is a non-integer. As a result, the color subcarrier reference signal will be shifted 180° for each new line. Unless some corrective action is taken this will result in ragged vertical lines. As will now be described, compensation is provided by delaying the occurrence of the 1+Mhz timing signal once for each line by a period of time corresponding to ½ cycle of the 3.58Mz subcarrier reference signal.

As shown in FIG. 3, the normal counting sequency for the shift counter 60 includes seven states. When the last stage of the four stage counter contains a binary-zero, a binary-one is loaded into the second stage (position 70). The first and second stages receive the output of the second stage when the last stage contains a binary-zero. Thus, the states become 1110 after the next shift, and finally the states become 1111 as indicated by path 68.

Each time a signal occurs on line 66 (every 65 cycles of the 1+Mhz signal) the normal sequencing within the counter 60 is altered as shown by the extended sequence of FIG. 3. When a signal occurs on line 66 and when the count of 0000 is reached, the loading of the binary-one into the second stage (position 70) is delayed for two cycles of the 14.318Mhz clock. These two cycles correspond to 180° of the 3.58Mhz signal. After these two cycles, a binary-one is then loaded into the second stage, followed by the loading of binary-ones into the first and third stages. As indicated by path 69, a normal counting sequence then occurs. By extending the count within counter 60 as described, compensation occurs which provides vertical color alignment from line-to-line.

Referring now to FIG. 2, the video generator 25 of FIG. 1 includes two, four bit shift registers 36 and 37. Each of these four bit shift registers is coupled to receive four bits of data on lines 30 from the RAM 23.

The registers 36 and 37 receive a load signal on line 49 which causes the data on lines 30*a* through 30*h* to be shifted into the registers. The first stage of register 37 ($I_0$) is coupled to a multiplexer 38 by line 42. The third stage of register 37 ($I_1$) is also coupled to the multiplexer 38 by line 43. In a similar fashion, the first stage of the register 36 ($I_2$) is coupled by line 44 to the multiplexer 38, and the third stage of this register ($I_3$) is also coupled to the multiplexer 38 by line 45.

Line 44 is coupled to the fourth stage of register 36 in order that four bits of data within register 36 may be recirculated. (Registers 36 and 37 shift data from left to right, that is, toward their first stage). The line 42 may be selectively coupled to the fourth stage of register 37 through the multiplexer 40 in order that four bits of data within register 37 may be recirculated. Line 44 may be coupled through the multiplexer 40 to the fourth stage of the shift register 37. When this occurs, the shift registers 36 and 37 operate as a single eight bit shift register.

Control signals designated as even/odd X (line 47) and upper/lower Y (line 48) are used to control multiplexer 38. During the color graphics mode the registers 36 and 37 operate as separate registers and data is alternately selected for coupling to line 26 by multiplexer 38. The upper/lower Y signal, during the color graphics mode, allow selection of data from either register 36 or 37. The odd/even X signal then toggles the data from the selected register by alternating selecting $I_0$ or $I_1$ if register 37 is selected, or $I_2$ or $I_3$ if register 36 is selected.

During the color graphics mode as presently implemented, eight bits of color information are shifted (in parallel) into the registers 36 and 37 from the RAM 23 at a $1^+$Mhz rate. This data is recirculated within registers 36 and 37 at a rate of 14.31818Mhz by the clocking signal received on line 33. The circulation of the data bit within the registers 36 and 37 at this rate provides signals having a 3.58Mhz component and as will be described, these signals may be readily employed for providing color signals for video display.

In the color graphics mode, as presently implemented, each of the display characters is divided into an upper and lower color rectangle. The RAM 23 provides the four bits of color data for the upper rectangles to registers 36 and for the lower rectangles to register 37. This color data for the presently preferred embodiment is coded as follows:

Red; 0001
Pink; 1011
Blue; 0010
Light Blue; 0111
Dark Green; 0100
Light Green; 1110
Brown; 1000
Yellow; 1101
Medium Violet; 0011
Medium Blue; 0110
Medium Green; 1100
Orange; 1001
White; 1111
Gray; 1010
Gray; 0101

Figure 4:
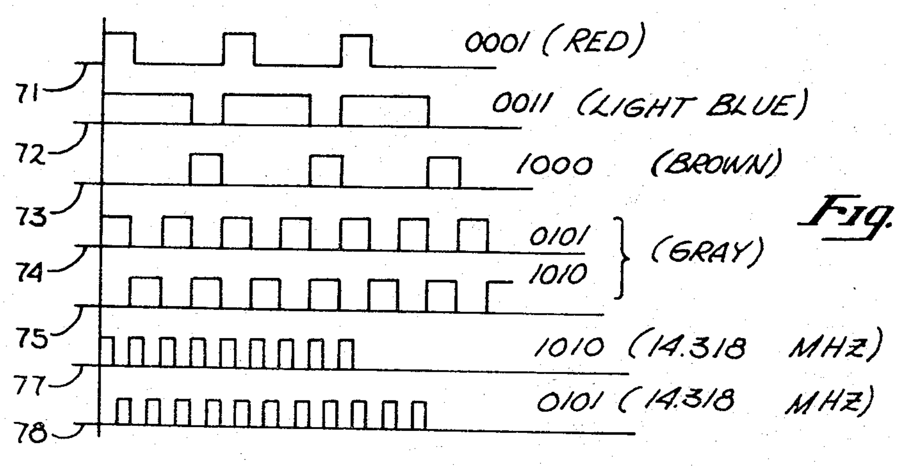
FIG. 4 is a graph illustrating several waveforms generated by the video generator of FIG. 2.

When colors are coded in this manner and circulated at the rate of 14.318Mhz in the registers, video color signals compatible with standard television receivers are produced. The resultant signal for red is shown on line 71 of FIG. 4, light blue on line 72, brown on line 73 and gray on lines 74 and 75.

Briefly referring again to FIG. 3, each count of the horizontal synchronization counter 63 corresponds to 3½ cycles of the subcarrier reference signal. Thus, a 180° phase shift occurs from character-to-character with respect to the color subcarrier reference signal. This means that the color signals must be shifted by 180° by the generator of FIG. 2, or the coding for these signals must be alternated for odd and even horizontal character positions. In the presently preferred embodiment, a 180° phase shift for the color signals is obtained by toggling between the first or third stages of the selected registers. For example, assume that the lower portion of a character is being displayed and that the color information is thus contained within register 37. Further assume that this information is being circulated, that is, line 42 couples stage 4 to stage 1 through the multiplexer 40. For even horizontal character positions, as indicated by the signal on line 47, the phase select multiplexer 38 couples the $I_0$ signal to line 26. For the odd positions, a 180° phase shift is obtained by selecting the $I_1$ signal.

During a second mode of operation the generator of FIG. 2 is used for providing high resolution graphics. In this case, eight bits of information are provided by the RAM 23 to the registers 36 and 37. For this high resolution mode line 42 is coupled to the video line 26 and the eight bits of data from RAM 23 are serially coupled to the video line 26 at the 14.318Mhz rate. The multiplexer 40 couples line 44 to the fourth stage of register 37 to provide a single eight bit shift register. The resultant signals are shown on lines 77 and 78 of FIG. 4. The signals on lines 77 and 78 provide either a green or violet display. In the presently preferred embodiment, data changes are employed to obtain the compensation provided by the multiplexer 38 during the color graphics mode.

Thus, a microcomputer has been disclosed which is particularly suitable for controlling a color video display. The unique timing means provides well defined vertical color lines without complicated programming changes while allowing the generation of horizontal synchronization signals at close to the standard rate. The unique video generator allows the generation of color signals directly from digital signals without the complex circuitry often employed in the prior art.

I claim:

1. In a microcomputer for use with a video display an improved timing apparatus comprising:

a timing reference means for providing a color reference signal for said video display;

a horizontal synchronization means for providing horizontal synchronization signals for said display, said synchronization means coupled to said timing reference means for synchronization with said reference means such that said synchronization signals occur at an odd-submultiple of said color reference signal;

timing compensation means coupled to said timing reference means and said horizontal synchronization means for adjusting said horizontal synchronization signals such that said horizontal synchronization signals are in phase relationship with said color reference signal;

whereby the color graphics on a raster scanned cathode ray tube are sharply defined in the vertical direction.

2. The apparatus defined by claim 1 wherein said horizontal synchronization means comprises a digital counter.

3. The apparatus defined by claim 2 wherein said timing compensation means periodically delays counting in said counter.

4. The apparatus defined by claim 3 wherein said color reference signal is an approximately 3.58Mhz signal and said horizontal synchronization signals occur at a frequency of approximately 15,734Hz.

5. In a microcomputer for use with a video display an improved timing apparatus comprising:

a horizontal synchronization counter;

a timing reference means for synchronizing said counter and for providing a color reference signal, said reference signal frequency being an odd-multiple greater than the rate at which counting occurs in said counter;

delay means for delaying counting in said counter when the count in said counter reaches a predetermined count, said delay means coupled to said horizontal synchronization counter and said timing reference means;

whereby well-defined color graphics may be readily stored and displayed on said video display.

6. The apparatus defined by claim 5 including a digital divider for dividing by an odd-integer coupled between said reference means and said counter.

7. The apparatus defined by claim 6 wherein said digital divider includes a shift register counter and wherein the loading of digital signals in said register counter is interrupted when said predetermined count is reached.

8. The apparatus defined by claim 7 wherein said color reference signal is an approximately 3.58Mhz signal and said predetermined count is reached at a frequency of approximately 15,734Hz.

* * * * *